United States Patent [19]
Wrobleski et al.

[11] Patent Number: 5,583,169
[45] Date of Patent: Dec. 10, 1996

[54] STABILIZATION OF POLYANILINE SOLUTIONS THROUGH ADDITIVES

[75] Inventors: Debra A. Wrobleski; Brian C. Benicewicz, both of Los Alamos, N.M.

[73] Assignee: The Regents of the University of California Office of Technology Transfer, Alameda, Calif.

[21] Appl. No.: 401,532

[22] Filed: Mar. 10, 1995

[51] Int. Cl.$^6$ .......................... C08K 5/3472; C08K 5/17
[52] U.S. Cl. .................. 524/99; 524/186; 524/251; 524/252; 524/236; 252/500; 528/422; 528/210
[58] Field of Search .................. 252/500; 528/422, 528/423, 424, 210, 214; 524/186, 236, 251, 252, 99

[56] References Cited

U.S. PATENT DOCUMENTS

| | | | |
|---|---|---|---|
| 4,983,322 | 1/1991 | Elsenbaumer | 252/500 |
| 5,115,057 | 5/1992 | Ono et al. | 526/256 |
| 5,135,682 | 8/1992 | Cohen et al. | 252/500 |

FOREIGN PATENT DOCUMENTS 6-03813  1/1994  Japan.

OTHER PUBLICATIONS

J. Yue et al., Polymer, 1992, Vol. 22, No. 20, pp. 4410–4418.
J. Yue et al., Journal of American Chemical Society, 1991, 113, 2665–2671.
J. Yue et al., Mol. Cryst. Liq. Cryst., 1990, vol. 189, pp. 255–261.

*Primary Examiner*—Paul Lieberman
*Assistant Examiner*—M. Kopec
*Attorney, Agent, or Firm*—Bruce H. Cottrell

[57] ABSTRACT

A stabilized non-conductive polyaniline solution comprising from about 1 to about 10 percent by weight polyaniline or a polyaniline derivative, from about 90 to about 99 percent by weight N-methylpyrrolidone, and from about 0.5 percent by weight to about 15 percent by weight of a solution stabilizing additive selected from the group consisting of hindered amine light stabilizers, polymeric amines, and dialkylamines, percent by weight of additive based on the total weight of polyaniline or polyaniline derivative is provided together with a method for stabilizing a polyaniline solution.

10 Claims, 2 Drawing Sheets

STABILIZATION OF POLYANILINE SOLUTIONS THROUGH ADDITIVES

FIELD OF THE INVENTION

The present invention relates to stabilized solutions of polyaniline and derivatives of polyaniline. This invention is the result of a contract with the Department of Energy (Contract No. W-7405-ENG-36).

BACKGROUND OF THE INVENTION

The development of polyaniline and its derivatives in the field of conducting polymers has yielded materials that can be formed into, e.g., continuous fibers and surface coatings through solution processing in organic-solvents such as N-methylpyrrolidone. Films of polyaniline have been used in electrical devices and as corrosion resistant undercoatings. A major problem in processing polyaniline solutions is that the solutions tend to gel over periods of time ranging from several minutes to several hours. It has been suggested that this tendency of solutions of polyaniline in the emeraldine base form to gel is due to crosslinking of polymer chains. Such crosslinking has been generally attributed to formation of physical crystalline regions or to formation of chemically bonded regions through oxidative processes.

In U.S. Pat. No. 5,135,682, Cohen et al. describe stable solutions of polyaniline generally including from about 10 to 30 percent by weight of polyaniline in a solvent selected from the group of 1,4-diaminocyclohexane, 1,5-diazabicyclo[4.3.0]non-5-ene, and a mixture of N-methylpyrrolidone with either pyrrolidine or ammonia in an amount sufficient to dissolve the polyaniline.

Unfortunately, the solvents and additives of Cohen et al. are all either liquid or gaseous. In the application of coatings, minimization of volatile organic content (VOC) has become a major objective because of pollution concerns. Thus, one desire would be a solid additive that could stabilize polyaniline solutions and avoid any additional VOC.

It is an object of the present invention to provide stabilized solutions of polyaniline or derivatives of polyaniline, such solutions including selected stabilizing additives, preferably selected solid stabilizing additives.

It is a further object of the invention to provide a method for stabilizing solutions of polyaniline or derivatives of polyaniline by addition of selected stabilizing additives, preferably addition of selected solid stabilizing additives.

SUMMARY OF THE INVENTION

To achieve the foregoing and other objects, and in accordance with the purposes of the present invention, as embodied and broadly described herein, the present invention provides a stabilized polyaniline solution including from about 1 to about 10 percent by weight polyaniline or a polyaniline derivative, from about 90 to about 99 percent by weight N-methylpyrrolidone, and from about 0.5 percent by weight to about 15 percent by weight of a solution stabilizing additive selected from the group consisting of hindered amine light stabilizers, polymeric amines and dialkylamines, percent by weight of additive based on the total weight of polyaniline or polyaniline derivative The present invention further provides a method of stabilizing a polyaniline or polyaniline derivative solution against gelation, the method including admixing with a solution including from about 1 to about 10 percent by weight polyaniline or polyaniline derivative, remainder being N-methylpyrrolidone, from about 0.5 to about 15 percent by weight of a solution stabilizing additive selected from the group consisting of hindered amine light stabilizers, polymeric amines, and dialkylamines, percent by weight of additive based on the total weight of polyaniline or polyaniline derivative.

DETAILED DESCRIPTION

The present invention is concerned with stabilized polyaniline solutions and to a method of stabilizing a polyaniline solution, i.e., extending the time before gelation of a polyaniline solution occurs.

Figure 1:
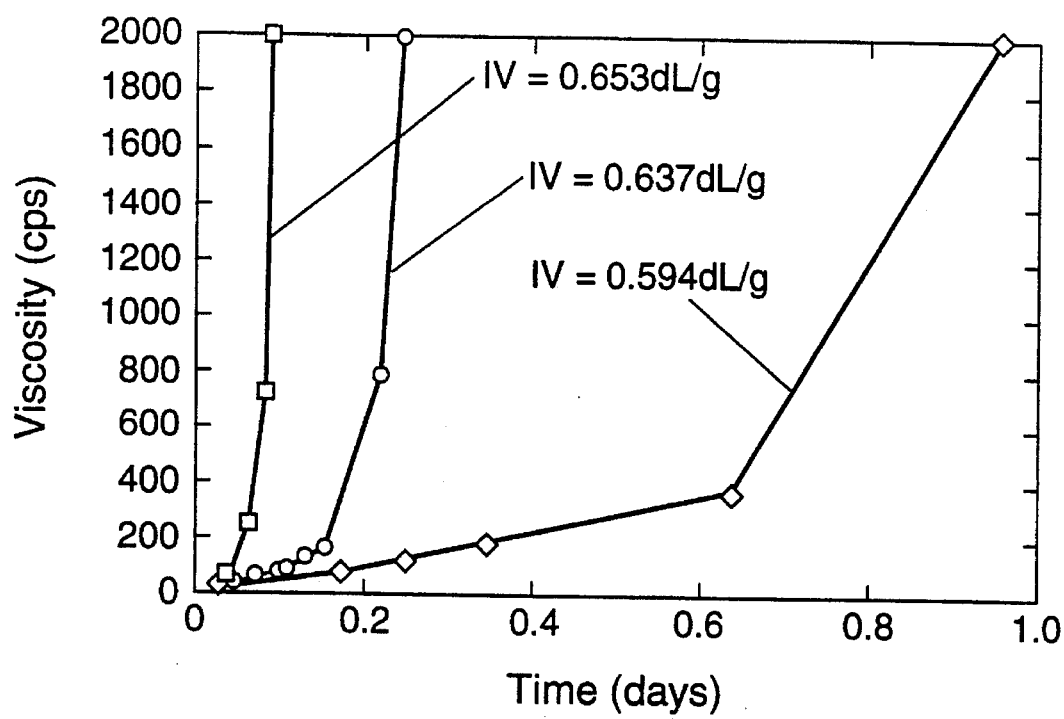
FIG. 1 is a graph showing viscosity plotted versus time until gelation for 5 percent by weight polyaniline solutions in N-methylpyrrolidone for three different inherent viscosities.

By terms such as "stabilized" and "stabilizing" is meant that the polyaniline solutions workable lifetime before gelation is substantially extended beyond the workable lifetime in the absence of the stabilizing additives described herein. Generally, the workable lifetime of a polyaniline solution decreases with increasing inherent viscosity as shown in FIG. 1. The time until gelation is plotted against viscosity and the time until gelation is seen to generally be less than one day decreasing down to about 0.2 days for inherent viscosities ranging from 0.594 deciliters per gram (dL/g) up to 0.653 dl/g.

Longer workable lifetimes without gelation are desired whether the polyaniline solution is being used to form a shape such as a fiber or being used to apply a coating as in the form of a thin film layer such as a paint. In either type case, short gelation times can prevent commercially viable processability. Longer processing times are especially desirable for coating applications to reduce waste.

The polyaniline in the present composition and process is generally of the base form (non-conductive type). After deposition of the polyaniline coating layer then the coating can be doped, e.g., by protonation to provide for the conductivity. The solvent used in forming the solutions of polyaniline is preferably N-methylpyrrolidone. The polyaniline can also be a polyaniline derivative, i.e., a substituted polyaniline as is well known to those of skill in the art.

The stabilizing additives of the present invention can generally be, e.g., any hindered amine light stabilizer, can be a dialkylamine wherein each alkyl is from a $C_1$ to a $C_4$, or may be a polymeric amine such as a polyalkyleneimine.

Dialkylamines include secondary amine functionality. Suitable dialkylamines include, e.g., diethylamine, butylmethylamine and the like. These materials have been found to provide significantly better stabilization than tertiary amines such as trietrhylamine. Similarly, the hindered amine light stabilizer preferably includes a secondary amine functionality, i.e., an amine group wherein the nitrogen is bound to a single hydrogen. It has generally been found that hindered amine light stabilizers with such a secondary amine functionality provide greater stabilization than hindered amine light stabilizers with tertiary amine functionalities.

Among the hindered amine light stabilizers useful in the present invention are included bis(2,2,6,6-tetramethyl-4-piperidinyl) decanedioate, available as Tinuvin® 770 from Ciba-Geigy, a condensation polymer of dimethyl succinate and 4-hydroxy-2,2,6,6-tetramethyl-1-piperidineethanol, available as Tinuvin® 622 LD from Ciba-Geigy, a N-methylated sterically hindered amine light stabilizer, available as Sanduvor® 3055 from Sandoz, and, a N-methylated sterically hindered amine light stabilizer, available as Sanduvor® 3056 from Sandoz. Tinuvin® 770 and Sanduvor® 3055 have been found to be especially preferred additives for stabilizing a solution of polyaniline in N-methylpyrrolidone. Sanduvor® 3055 has the following structure:

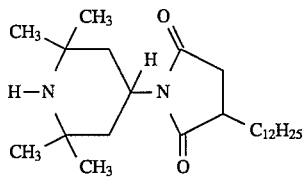

and Sanduvor® 3056 has the structure:

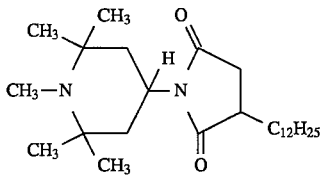

The term "hindered amine light stabilizer" is meant simply to refer to that class of amine compounds that are typically referred to by that description because of certain light stabilizing properties. In the present invention, however, while referred to as "hindered amine light stabilizer", it is not meant to imply any such light stabilization but simply to refer to a class of materials.

In the polymeric amine, such as the polyalkyleneimine, the alkylene group is preferably ethylene or propylene, more preferably, ethylene. The polyalkyleneimine may be linear or branched and generally will include primary amine functionality, secondary amine functionality, tertiary amine functionality or combinations thereof. In such polymeric amines, there is preferably at least some secondary amine functionality present. Tinuvin® 622 LD could also be termed a polymeric amine.

The preferred stabilizing additives in the present invention are non-volatile solids so that their addition to a film forming composition does not contribute to any VOC problem. Such solid materials include the hindered amine light stabilizers including Tinuvin® 770 from Ciba-Geigy, Tinuvin® 622 LD from Ciba-Geigy, Sanduvor® 3055 from Sandoz, and Sanduvor® 3056 from Sandoz and may include the polymeric amines such as polyalkyleneimines.

The stabilizing additive is generally added to the solution in amounts from about 0.5 percent by weight to about 15 percent by weight based on the total weight of polyaniline material in the solution, preferably from about 1 percent by weight to about 5 percent by weight, and more preferably from about 1 percent by weight to about 2 percent by weight. Larger amounts of additive may be used if desired so long as the amount is not sufficient to degrade the film-forming properties of the composition.

The present invention is more particularly described in the following examples which are intended as illustrative only, since numerous modifications and variations will be apparent to those skilled in the art.

EXAMPLE

The emeraldine base of polyaniline was prepared by ammonium persulfate oxidation of aniline in hydrochloric acid solution using methods in accordance with Cao et al., Polymer, v. 30, pp.2305–2311 (1989), followed by treatment with three percent ammonium hydroxide for two hours. The relative polymer weights were determined by inherent viscosity measurements at 30.0° C. in 0.1 percent weight to volume (w/v) solution in concentrated sulfuric acid using an Ubbelohde viscometer. Brookfield viscosities were measured for 5 percent by weight polyaniline (emeraldine base form) solutions in N-methylpyrrolidone, such solutions prepared by stirring a mixture of the polyaniline (emeraldine base form) powder and N-methylpyrrolidone for 35 minutes followed by filtration through a 60 micron in-line filter. This stock solution was then used to prepare final solutions by mixing in the appropriate amount of stabilizing additive. The amount of additive was based upon the total polyaniline solids in solution. These final solutions were placed in a Brookfield viscometer equipped with a Brookfield UL adapter with a water jacket at 25° C. The viscosities of these solutions were monitored at regular intervals until gelation.

Figure 2:
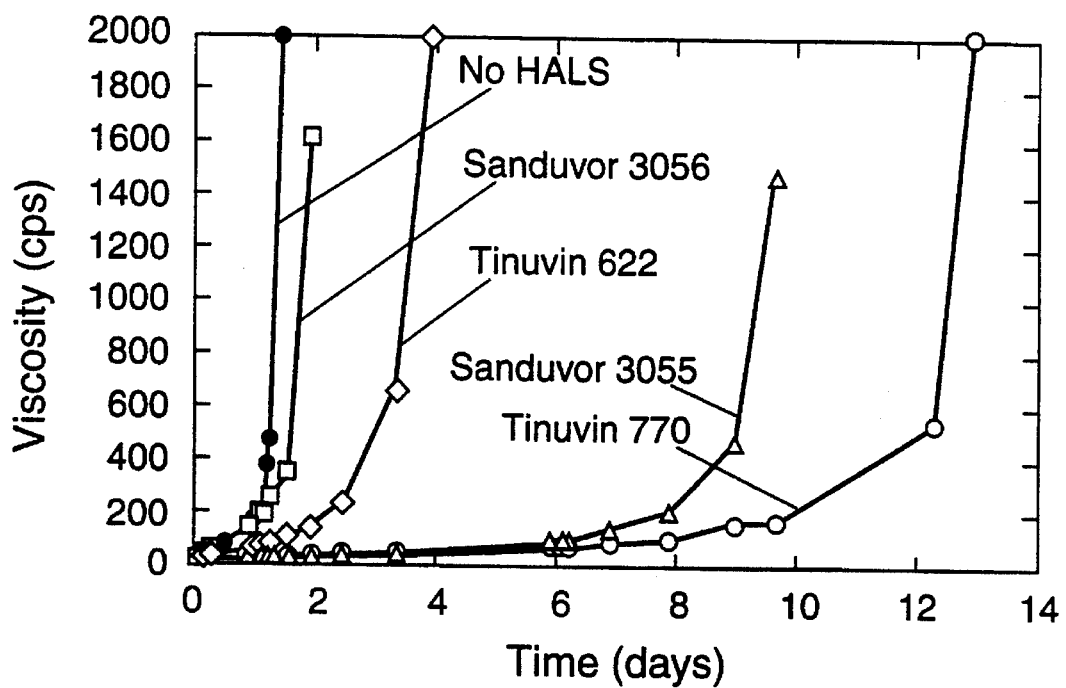
FIG. 2 is a graph showing the effect of different additives on gelation of 5 percent by weight polyaniline solutions in N-methylpyrrolidone at an inherent viscosity of 0.594 dL/g and 2 percent by weight of the additive, percent weight of additive based on total weight polyaniline.
Figure 3:
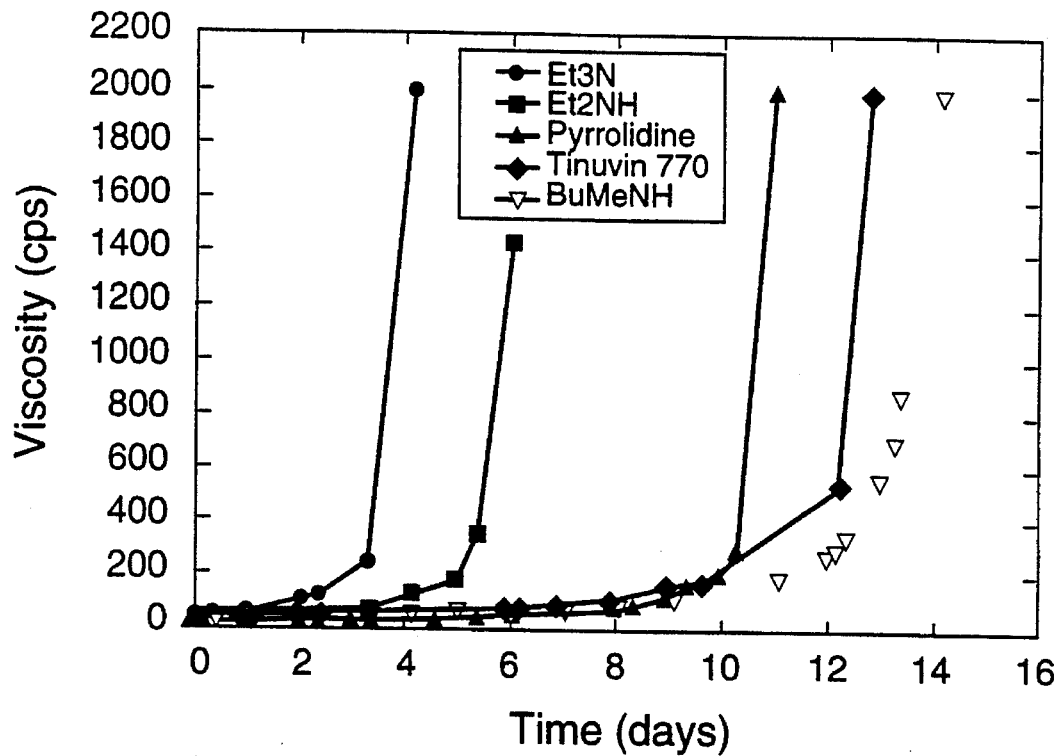
FIG. 3 is a graph showing the effect of different amine additives on gelation of 5 percent by weight polyaniline solutions in N-methylpyrrolidone at an inherent viscosity of 0.594 dL/g and 2 percent by weight of the additive, percent weight of additive based on total weight polyaniline.
Figure 4:
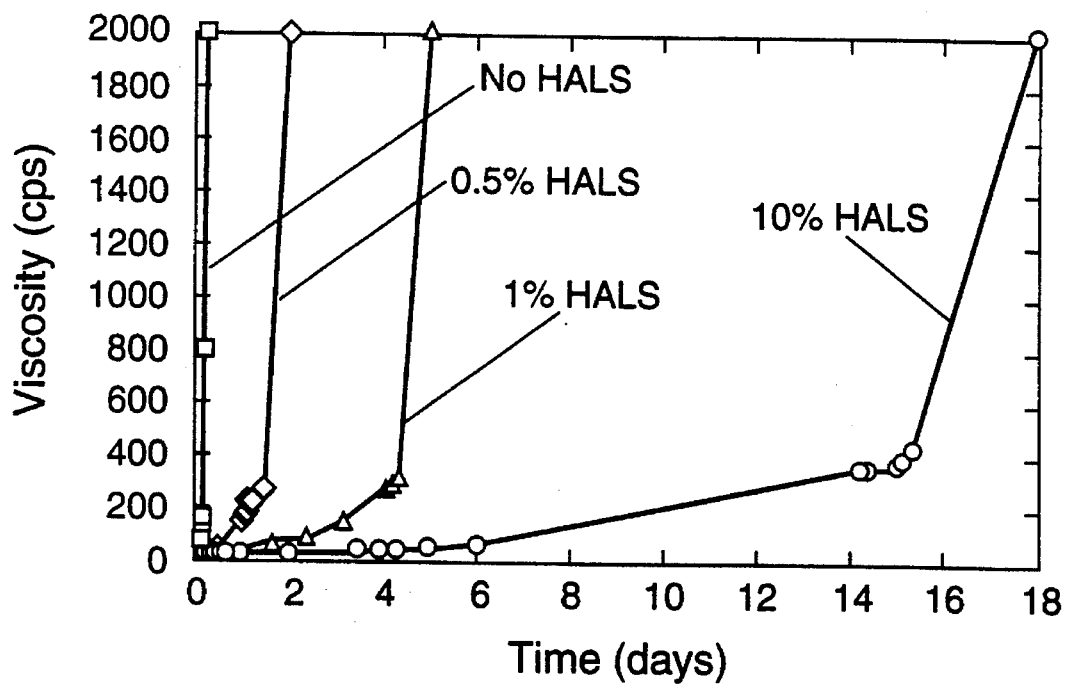
FIG. 4 is a graph showing the effect of different concentrations of an amine additive on gelation of 5 percent by weight polyaniline solutions in N-methylpyrrolidone at an inherent viscosity of 0.594 dL/g and 2 percent by weight of the additive, percent weight of additive based on total weight polyaniline.

Initially, the relationship between polyaniline molecular weight and gelation time was examined. FIG. 1 shows that gelation time decreases with increasing molecular weight. Then, a series of hindered amine light stabilizers were examined for their effect on gelation time. FIG. 2 shows the delayed gelation time with the addition of 2 percent by weight of the various additives based on total polyaniline solids in solution. The materials containing secondary amine functionality, i.e., the Tinuvin® 770 and Sanduvor® 3055, provided the longest delay in gelation time. Also, the relationship between concentration of stabilizing additive and gelation time was examined. Next, a series of other amines were examined for their effect on gelation time. FIG. 3 shows the delayed gelation time with the addition of 2 percent by weight of the various additives based on total polyaniline solids in solution. The material containing secondary amine functionality, i.e., the butylmethylamine, provided the longest delay in gelation time. Finally, the effects of differing concentration of additive was examined. FIG. 4 shows the results obtained with differing concentrations of the Tinuvin® 770 material and it can be seen that addition of as little as 0.5 percent by weight of the additive delayed gelation for about 1 day and addition of as little as 2.0 percent by weight of the additive delayed gelation for about 12 days.

Although the present invention has been described with reference to specific details, it is not intended that such details should be regarded as limitations upon the scope of the invention, except as and to the extent that they are included in the accompanying claims.

What is claimed is:
1. A stabilized polyaniline solution comprising from about

1 to about 10 percent by weight of an undoped, non-conductive polyaniline, from about 90 to about 99 percent by weight N-methylpyrrolidone, and from about 0.5 percent by weight to about 15 percent by weight of a solution stabilizing additive selected from the group consisting of hindered amine light stabilizers, polyalkyleneimines, and dialkylamines, percent by weight of additive based on the total weight of undoped polyaniline.

2. The stabilized solution of claim 1 wherein said solution stabilizing additive is selected from the group consisting of hindered amine light stabilizers and polyalkyleneimines, said solution stabilizing additive further characterized as a solid material at room temperature.

3. The stabilized solution of claim 1 wherein said solution stabilizing additive is bis(2,2,6,6-tetramethyl-4-piperidinyl) decanedioate.

4. The stabilized solution of claim 1 wherein said solution stabilizing additive is present in an amount of from about 1 to 5 percent by weight based on the total weight of undoped polyaniline.

5. The stabilized solution of claim 1 wherein the solution stabilizing additive is butylmethylamine.

6. A method of stabilizing an undoped non-conductive polyaniline solution against gelation comprising admixing with a solution including from about 1 to about 10 percent by weight of an undoped non-conductive polyaniline, remainder being N-methylpyrrolidone, from about 0.5 to about 15 percent by weight of a solution stabilizing additive selected from the group consisting of hindered amine light stabilizers, polyalkyleneimines, and dialkylamines, percent by weight of additive based on the total weight of undoped polyaniline.

7. The method of claim 6 wherein said solution stabilizing additive is selected from the group consisting of hindered amine light stabilizers and polyalkyleneimines, said solution stabilizing additive further characterized as a solid material at room temperature.

8. The method of claim 6 wherein said solution stabilizing additive is bis(2,2,6,6-tetramethyl-4-piperidinyl) decanedioate.

9. The method of claim 6 wherein said solution stabilizing additive is present in an amount of from about 1 to 5 percent by weight based on the total weight of undoped polyaniline.

10. In a process of stabilizing a solution of an undoped, non-conductive polyaniline and an organic solvent by addition of about 0.5 to about 15 percent by weight a stabilizing additive, the improvement wherein said stabilizing additive is selected from the group consisting of hindered amine light stabilizers, polyalkyleneimines, and dialkylamines.

* * * * *